No. 677,024. Patented June 25, 1901.
W. J. FAUL.
LUBRICATING APPARATUS.
(Application filed Mar. 21, 1898.)
(No Model.) 2 Sheets—Sheet 1.
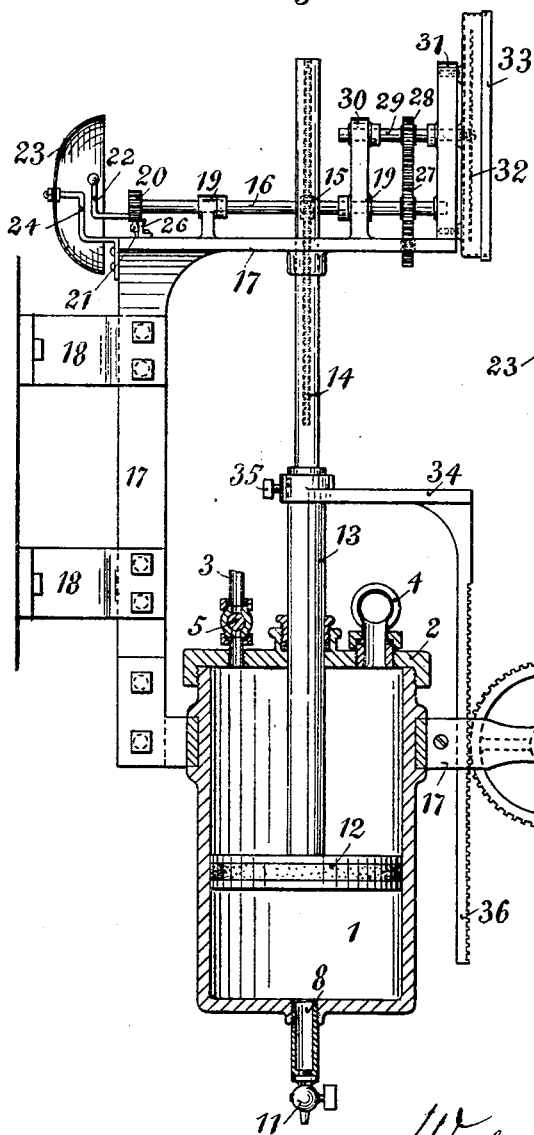
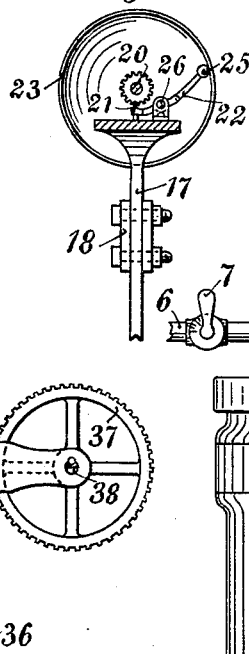
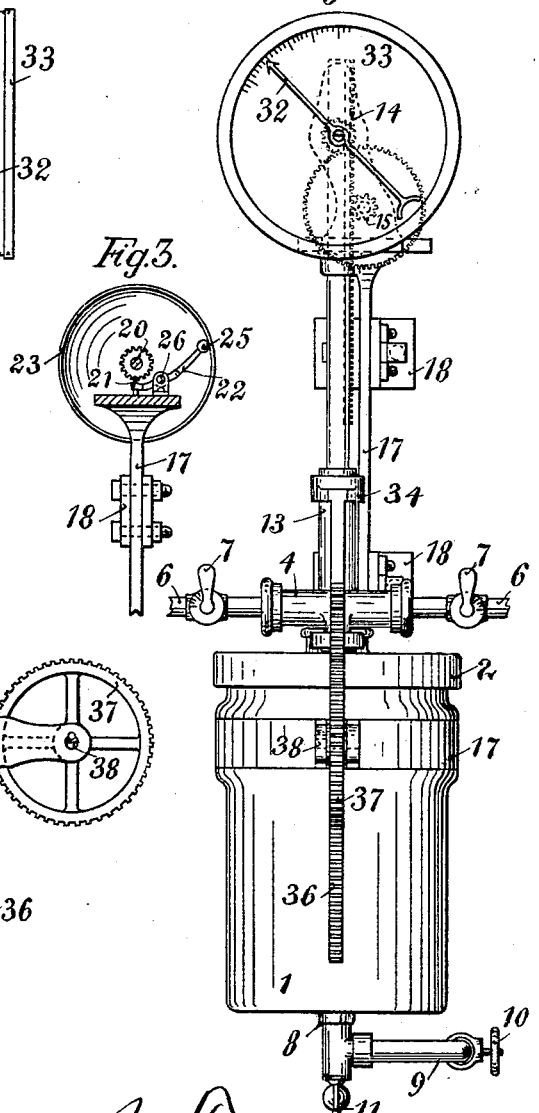

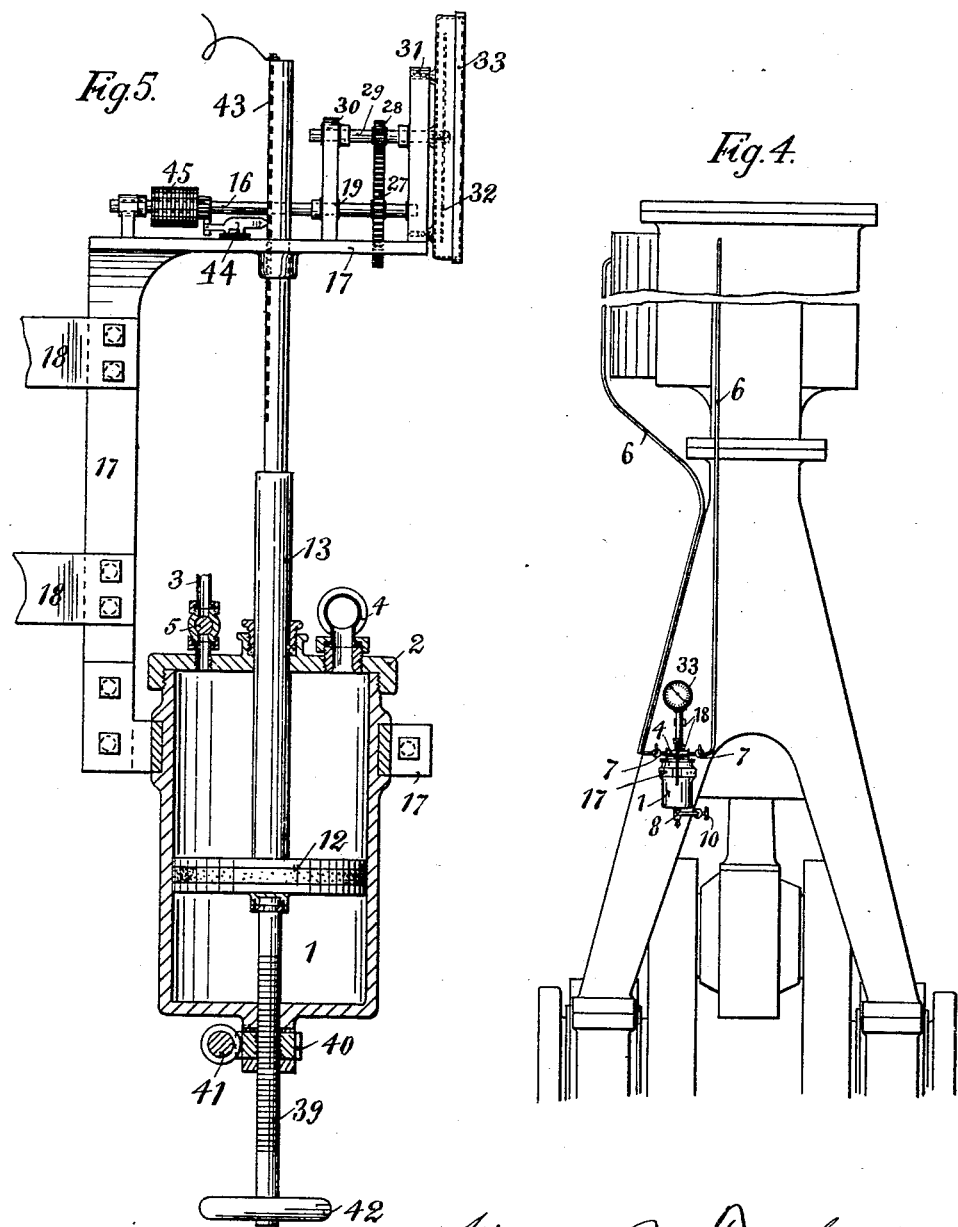

UNITED STATES PATENT OFFICE.

WILLIAM J. FAUL, OF NEW YORK, N. Y.

LUBRICATING APPARATUS.

SPECIFICATION forming part of Letters Patent No. 677,024, dated June 25, 1901.

Application filed March 21, 1898. Serial No. 674,649. (No model.)

*To all whom it may concern:*

Be it known that I, WILLIAM J. FAUL, of New York, county and State of New York, have invented certain new and useful Improvements in Lubricating Apparatus, of which the following is a full, clear, and exact specification, reference being had to the accompanying drawings, wherein—

Figure 1 is a side elevation, partly a section, of my improved lubricating apparatus; Fig. 2, a front elevation of the same; Fig. 3, a detail front view showing the mechanism operating the gong; Fig. 4, a side elevation of an upright engine provided with my improved lubricating apparatus; Fig. 5, an elevation, partly a section, showing a modified construction of my improved lubricating apparatus and of the mechanism for operating the feed-indicating devices.

Similar numerals of reference indicate corresponding parts in all views of the drawings.

My invention retates to lubricating apparatus; and it consists of the hereinafter-described construction of an automatic lubricator and of the combination therewith of the devices for visibly and audibly indicating the flow of the lubricant.

It is very important that an engine while in operation be constantly and sufficiently provided with lubricant and that the flow of the lubricant be steady and capable of regulation. There are many different constructions of lubricating apparatuses known and in use which tend to accomplish this object. The so-called "sight-feed" lubricators are defective in that under certain conditions the flow of the oil through the glass tube is continuous, not in drops, and in such case it is impossible for the tender of the engine to determine the quantity or velocity of the flow with any approach to accuracy. Besides this it is also necessary for the tender of the engine to spend considerable time in observing the flow, and when his attention is required elsewhere he would not be informed if the lubricating apparatus should cease to operate until probably the working of the engine itself would call his attention to it.

My invention tends to provide an apparatus which can be accurately adjusted to feed continuously the required quantity of lubricant and to combine with it devices signaling visibly and audibly, whether the apparatus acts or not, and indicating also the quantity and velocity of the feed.

The construction of my improved lubricating apparatus in illustrated in Fig. 1 of the drawings. Cup 1 is of the usual cylindrical shape and closed on top by lid 2, provided with inlet connection 3 and outlet connection 4. The inlet-pipe 3 is provided with a stop-cock 5 and may be connected to a tank or other means for holding the oil for the cup. Outlet connection 4 is divided into feed-pipes 6, provided with graduated stop-cocks 7 and conveying the oil from the cup 1 into the chest and into the cylinder of the engine, respectively. In the bottom of the cup is an aperture 8, to which a steam-feed pipe 9, provided with stop-cock 10, is connected by a T-shaped fixture, in the lower end of which is fixed cock 11, serving as an outlet or exhaust. Piston 12 is snugly fitted in the cup, and piston-rod 13, passing through the lid 2, terminates in a rack 14, meshing with pinion 15, set on shaft 16, operating the indicating devices. These are mounted upon the frame 17, which also supports the cup 1 in its position and serves for affixing the lubricating apparatus to the standard of an engine by means of brackets 18. Shaft 16 is mounted in standards 19, and pinion 15 is rigidly keyed to it. On the inner end of shaft 16 is also rigidly keyed thereto a wheel 20, having a serrated rim engaging with a spring-pointer 21, affixed to the short end of the lever 22, fulcrumed in lug 26. Gong 23 is fixed on bracket 24. Hammer 25, set on the longer end of lever 22, rests normally on the inside of the gong, as shown in Fig. 3. When shaft 16 is in motion, wheel 20, engaging with the spring-pointer 21, lifts intermittently hammer 25, which then when dropping again to its normal position strikes the gong and produces a sound, indicating audibly that the apparatus is in action. The strokes follow in more rapid succession the faster the shaft 16 is turned, and their more or less rapid succession thus indicates the speed of the apparatus. On the same shaft 16 is keyed wheel 27, meshing with pinion 28, rigidly secured to shaft 29 in standards 30 and 31. On the outer end of the shaft 29 is fixed a pointer 32, traversing the scale provided on the periphery of dial 33, affixed to the standard 31, thus visibly indicating the action and the speed of the apparatus.

Bracket 34, adjustably secured by screw 35 to the piston-rod and extended into rack 36, serves for operating the piston 12 by turning the wheel 37, mounted on stud 38, pillowed in the projecting ends of the frame 17. This device is used mainly for driving the piston downwardly to draw the oil into the cup and is operated by taking hold of the spokes of the wheel 37 and moving it in the required direction. For greater convenience the shaft 38 may be extended to project on one side and squared or otherwise fitted to receive a crank, by means of which it may be turned. Sometimes it is necessary to throw a larger quantity of lubricant into the working cylinder of the engine, and in such a case this device for operating the piston 12 can also be used for this purpose by moving the piston upwardly, thus aiding the action of the steam.

The lubricating apparatus acts as follows: At the start the piston 12 is driven downwardly to the bottom of the cup 1, whereby the lubricating-oil is drawn into the cup through inlet-pipe 3 into the space above the piston 12. Thereupon stop-cock 5 is closed and cocks 7 and valve 10 opened, the latter admitting steam underneath the piston 12. The steam pressing upon the piston 12 from beneath drives the oil through outlet 4 into feed-pipes 6 and is conveyed into the chest and cylinder of the engine or wherever it might be required. As the piston 12 is forced upwardly it imparts a rotary motion to the pinion 15 and to the shaft 16, and thus the indicating apparatus is set in motion. When adjusting the flow of the oil, the tender of the engine will observe the pointer 32, which by reason of the multiplying-gear 27 and by reason of its own length, increasing its swing, indicates more sensitively and more definitely the speed of the piston 12. The gearing operating the pointer must be so proportioned to the area of the piston 12 that the motion of the pointer will indicate the quantity of the lubricant passing through the feed-pipes in degrees upon the dial. The tender of the engine will then be able to exactly adjust the lubricator to feed the required quantity of lubricant and to regulate in accordance therewith the pressure of steam.

When the apparatus is once adjusted, the tender of the engine does not need to devote any time to observing its operation. The ticking or sounding of the gong will keep him constantly informed that the apparatus is in operation and also when its speed increases or decreases. When the apparatus should stop in its action for any reason whatsoever, the sounding of the gong will cease, and thus inform the tender of the engine.

When the piston reaches the top of the cup 1, its motion is stopped, and then the apparatus is refilled and again set in operation. First cocks 7 are shut and cock 5 opened, the steam is turned off by closing the valve 10, and cock 11 opened, whereupon piston 12 is moved downwardly by turning wheel 37 in the required direction, thus drawing in the oil into the cup, and then the lubricator is again started, as described above.

In Fig. 5 a modified construction of my improved lubricating apparatus is shown which is more suitable for gas and oil engines and such other machines where steam is not available. In this apparatus the piston 12 is operated by screw 39, the screw being driven by worm-gear 40 and 41, the worm-wheel 40 serving as a driving-nut. Worm 41 is keyed to a shaft which is rotated by a belt or other motion-transmitting device from the main shaft of the engine. Piston 12 can also be moved by turning the hand-wheel 42, secured to the end of screw 39. This device serves also for the purpose as described with reference to the rack 36 and wheel 37 in the other construction. In other respects the arrangement of the lubricating apparatus is the same. In the same view, Fig. 5, an electrical device for actuating the shaft 16 is shown as a substitute for the rack 14 and pinion 15, described above. In this modified construction the piston-rod 13 terminates in an intermittent conductor 43, and a contact-piece 44 is fixed on the top of frame 17, serving as a switch for connecting the electric circuit between the intermittent conductor 43 and the electric motor 45, set on the shaft 16. This electric motor 45 consists of an armature affixed to the shaft 16 and a magnetic field surrounding the same. The motor receives the electric current through the connecting-rod 13, whose surface, which is in contact with the contact-piece 44, is divided by strips of insulating material, so as to alternately close and break the circuit as the piston 12 moves, whereby the motor 45 is alternately started and stopped. By the motion of the piston 12 an intermittent motion is imparted to the shaft 16, causing it to turn and operate the indicating devices in the manner as described above. When the motion of the piston 12 ceases at a moment when the electric circuit is closed, the gong 23 will be rung continuously and will, like the sounding of an alarm, call the attention of the tender of the engine to the apparatus. If the motion of the piston 12 ceases while the electric circuit is interrupted, then the sounding of the gong will also cease and the absence of the sound will indicate the stopping of the apparatus. This apparatus will also indicate the speed of the motion and the quantity of the lubricator fed into the engine in the same manner as the devices described above.

The illustration in Fig. 4 shows the manner of affixing the lubricating apparatus in suitable position to a marine engine.

I claim as my invention and desire to secure by Letters Patent—

1. The combination in a lubricating apparatus, with mechanism for discharging the lubricant therefrom, of mechanism for visibly indicating the volume and speed of the flow of the lubricant, the indicating mechanism being operatively connected with the mechansm for discharging the lubricant.

2. The combination with a lubricating apparatus comprising a vessel adapted to hold the lubricant and provided with an outlet, mechanism for discharging the lubricant from the vessel and means for regulating the volume and speed of the discharge, of mechanism for visibly indicating the volume and speed of the flow of the lubricant discharged from the apparatus, the indicating mechanism being operatively connected with the mechanism for discharging the lubricant.

3. The combination with a lubricating apparatus comprising a vessel adapted to hold the lubricant and provided with an outlet, mechanism for discharging the lubricant from the vessel, means for governing the volume and speed of the discharge, and means for audibly signaling the continuous action of the lubricating apparatus, of mechanism for visibly indicating the volume and speed of the flow of the lubricant discharged from the apparatus, operatively connected with the mechanism for discharging the lubricant.

4. The combination with a lubricating apparatus comprising a vessel adapted to hold the lubricant and provided with an outlet, mechanism for discharging the lubricant from the vessel and means for governing the volume and speed of the discharge, of means for audibly signaling the continuous action and speed of the lubricating apparatus and for simultaneously visibly indicating the volume and speed of the flow of the lubricant discharged from the apparatus, the mechanism for visibly indicating the volume and speed of the flow of the lubricant being operatively connected with the mechanism for discharging the lubricant from the lubricating apparatus.

5. A lubricating apparatus comprising a closed vessel, a piston fitted in the vessel, an inlet and an outlet above the piston, means for moving the piston in the vessel and means for simultaneously indicating visibly and audibly the quantity and speed of the flow of the lubricant, the mechanism for visibly indicating the volume and speed of the flow of the lubricant being operatively connected with the mechanism for discharging the lubricant from the lubricating apparatus.

6. The combination with a lubricating apparatus comprising a closed vessel, a piston fitted in the vessel, and means for moving the piston, of mechanism for simultaneously indicating visibly and audibly the quantity and speed of the flow of the lubricant, the mechanism for visibly indicating the volume and speed of the flow of the lubricant being operatively connected with the mechanism for discharging the lubricant from the lubricating apparatus.

In witness that I claim the improvements described in the foregoing specification I have signed my name in the presence of two subscribing witnesses.

WILLIAM J. FAUL.

Witnesses:
 HENRY SCHREITER,
 ROBERT VALENTINE MATHEWS.